(12) United States Patent
Li et al.

(10) Patent No.: US 7,933,518 B2
(45) Date of Patent: Apr. 26, 2011

(54) INTELLIGENT OPTICAL SYSTEMS AND METHODS FOR OPTICAL-LAYER MANAGEMENT

(75) Inventors: Wen Li, Fremont, CA (US); Jianhui Zhou, San Jose, CA (US); Wen Huang, Cupertino, CA (US); Fulin Pan, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 636 days.

(21) Appl. No.: 12/035,327

(22) Filed: Feb. 21, 2008

(65) Prior Publication Data
US 2009/0214221 A1    Aug. 27, 2009

(51) Int. Cl.
*H04B 10/08*    (2006.01)
(52) U.S. Cl. ........... 398/22; 398/137; 398/139; 398/185
(58) Field of Classification Search .............. 398/22, 398/137, 139
See application file for complete search history.

(56) References Cited

U.S. PATENT DOCUMENTS

| | | |
|---|---|---|
| 5,680,234 A | 10/1997 | Darcie |
| 5,694,234 A | 12/1997 | Darcie |
| 5,864,413 A | 1/1999 | Feldman |
| 5,907,417 A | 5/1999 | Darcie |
| 6,151,144 A | 11/2000 | Knox |
| 6,304,350 B1 | 10/2001 | Doerr |
| 6,381,047 B1 | 4/2002 | Frigo |
| 6,411,410 B1 | 6/2002 | Wright |
| 6,721,506 B1 | 4/2004 | Lam |
| 2002/0039214 A1 | 4/2002 | Ruan |
| 2002/0186439 A1 | 12/2002 | Buabbud |
| 2003/0180049 A1 | 9/2003 | Park |
| 2004/0071389 A1* | 4/2004 | Hofmeister et al. ............ 385/16 |
| 2004/0091265 A1 | 5/2004 | Kim |
| 2006/0147211 A1 | 7/2006 | Kim |
| 2006/0153566 A1 | 7/2006 | Sorin |
| 2007/0116466 A1 | 5/2007 | Gewirtzman |
| 2007/0165688 A1 | 7/2007 | Lee |
| 2008/0304825 A1* | 12/2008 | Mahony et al. ................. 398/38 |

* cited by examiner

*Primary Examiner* — Leslie Pascal
(74) *Attorney, Agent, or Firm* — SV Patent Service

(57) ABSTRACT

An integrated optical transceiver includes an optical receiver that produces a first electrical signal at a reception electrical interface in response to a first optical signal, an optical transmitter that emits a second optical signal in response to a second electrical signal received at a transmission electrical interface, a first optical branching device that receives the first optical signal at an reception optical interface and to direct at least a portion of the first optical signal to the optical receiver, and a second optical branching device that directs the second optical signal to an transmission optical interface. The first optical branching device directs at least a portion of the first optical signal to the second optical branching device. The second optical branching device directs the portion of the first optical signal received from the first optical branching device to the transmission optical interface.

14 Claims, 10 Drawing Sheets

INTELLIGENT OPTICAL SYSTEMS AND METHODS FOR OPTICAL-LAYER MANAGEMENT

BACKGROUND

The present disclosure relates to optical networking systems and optical transceivers used in the systems.

As voice over Internet Protocol (VoIP) and Internet Protocol television (IPTV) grow in popularity, an increasing number of users desire to have access to these services from their premises. Similarly, businesses now require more bandwidth available to their premises with necessary quality of service. To meet these needs, network carriers are building optical access networks with different network topologies such as fiber-to-the-premises, fiber-to-the-node, or fiber-to-the-building with many different access transport solutions including BPON, EPON, GPON, WDN-PON and active Ethernet. As service provides' networks are becoming more complex, reliable services and effective management of the networks have become key challenges for service providers to ensure service level agreement (SLA) and guarantee customer satisfaction.

SUMMARY

In a general aspect, the present specification relates to an integrated optical transceiver that includes an optical receiver that can produce a first electrical signal at a reception electrical interface in response to a first optical signal, an optical transmitter that can emit a second optical signal in response to a second electrical signal received at a transmission electrical interface, a first optical branching device that can receive the first optical signal at a reception optical interface and to direct at least a portion of the first optical signal to the optical receiver; and a second optical branching device that can direct the second optical signal to a transmission optical interface. The first optical branching device can direct at least a portion of the first optical signal to the second optical branching device. The second optical branching device can direct the portion of the first optical signal received from the first optical branching device to the transmission optical interface.

In another general aspect, the present specification relates to an optical communication system that includes a first optical transceiver module comprising a power failure monitor configured to detect imminent power failure in the first optical transceiver module and to produce a dying-gasp signal when an imminent power failure is detected in the first optical transceiver module, the first transmitter being configured to output a first optical signal comprising the dying-gasp signal at a transmission optical interface. The optical communication system also includes a second optical transceiver module including a second receiver configured to receive the first optical signal comprising the dying-gasp signal from the first optical transceiver via an optical link and to output a second electrical signal in response to the first optical signal and a dying gasp detector configured to detect the dying-gasp signal in the first optical signal or the second electrical signal.

In another general aspect, the present specification relates to an optical network system that includes a plurality of first optical transceiver modules each comprising a first transmitter that can output a downstream optical signal in response to a downstream modulation control signal and a first downstream electrical signal comprising downstream user data; a first receiver that can receive an upstream optical signal, wherein the upstream optical signal comprises upstream user data and a upstream modulation signal carrying upstream management information, wherein the first optical receiver can output a first electrical signal comprising the upstream modulation signal and to output a first upstream electrical signal comprising the upstream user data; and a first processing unit that can produce the downstream modulation control signal in response to downstream management information and can demodulate the first electrical signal to extract the upstream management information. The optical network system includes a first wavelength filter comprising a plurality of first branching ports each associated with one of the first optical transceiver modules and being configured to receive the downstream optical signal from the first transmitter in the associated first optical transceiver module and send the upstream optical signal to the first receiver in the associated first optical transceiver module, wherein each of the first branching ports is associated with a wavelength channel; and a first common port that can output the downstream optical signal received at the one of the first branching ports. The optical network system includes a plurality of optical network units each comprising a second receiver that can receive the downstream optical signal and output a second electrical signal comprising the downstream modulation control signal and a second downstream electrical signal comprising the downstream user data; a second processing unit that can demodulate the second electrical signal to extract the downstream management information and to produce an upstream modulation control signal in response to the upstream management information; and a second transmitter that can emit the upstream optical signal in response to the upstream modulation control signal and a second upstream electrical signal comprising the upstream user data. The optical network system also includes a second wavelength filter comprising a plurality of second branching ports each configured to receive the upstream optical signal from one of the optical network units and send the downstream optical signal to the one of the optical network units and a second common port that can output the upstream optical signal to the first common port and receive the downstream optical signal from the first common port.

In yet another general aspect, the present specification relates to a method for optical communication method of optical communication by an optical transceiver. The method includes producing a first electrical signal at a reception electrical interface in response to a first optical signal by an optical receiver; emitting a second optical signal by an optical transmitter in response to a second electrical signal received at a transmission electrical interface; receiving the first optical signal at an reception optical interface by the a first optical branching device; directing at least a portion of the first optical signal to the optical receiver by the a first optical branching device; directing the second optical signal to an transmission optical interface by a second optical branching device; directing at least a portion of the first optical signal to the second optical branching device by the first optical branching device; and directing the portion of the first optical signal received from the first optical branching device to the transmission optical interface by the second optical branching device.

In still another general aspect, the present specification relates to a method for optical communication. The method includes detecting imminent power failure in a first optical transceiver module by a power failure monitor; producing a dying-gasp signal by the power failure monitor when an imminent power failure is detected in the first optical transceiver module; outputting a first optical signal comprising the dying-gasp signal at a transmission optical interface; receiving the first optical signal comprising the dying-gasp signal from the first optical transceiver by a second receiver in a second optical transceiver module; outputting a second electrical signal in response to the first optical signal; and detecting the dying-gasp signal in the first optical signal or the second electrical signal by a dying gasp detector.

Implementations of the system may include one or more of the following. The first optical branching device and the second optical branching device can include beam splitter, an optical switch, or a variable optical attenuator. The reception electrical interface and the transmission electrical interface can comply with a standard selected from the group consisting of SFF, SFP, XFP, and SFP+. The reception electrical interface and the transmission electrical interface can be plugged into a host network equipment. The integrated optical transceiver can further include a power failure monitor configured to detect power failure in the integrated optical transceiver and to produce a dying-gasp signal when an imminent power failure is detected in the integrated optical transceiver, wherein the optical transmitter is configured to output the second optical signal at least partially in responsive to the dying-gasp signal. The dying-gasp signal can be carried by an envelop modulation or on/off toggling in the second optical signal.

Embodiments may include one or more of the following advantages. The disclosed systems and methods provide more reliable communications by direct and reliable monitoring of optical communications by establishing an optical layer communication channel that is non-intrusive to the user data traffic. The disclosed systems and methods can eliminate the needs for demarcation equipment in some conventional optical network systems. The functions of the optical transceivers are enriched by functions integrated in an optical transceiver, which include non-intrusive optical communication channel, optical layer management, and data feedback capability. These functions are not available in the conventional optical transceivers.

Moreover, optical layer management is provided without adding overhead to the user data and the host equipment into which the disclosed optical transceivers are plugged. The disclosed system and methods do not require costly installations (such as digital wrapper or extra interoperable equipment) at customer premises. Furthermore, the disclosed optical transceiver is compliant with industry-standard optical transceiver formats. The disclosed optical transceiver can be implemented as a device which receives electric power from the host equipment into which it is plugged. The disclosed optical transceiver is applicable to a multi-channel optical communication network such as an optical network between an optical terminal, remote nodes, and optical network units.

Furthermore, the disclosed systems and methods provide optical loop back that allows remote testing of optical links in addition to data loop-back function or when data loop-back function is unavailable. The optical loop back can be implemented in optical transceiver devices and can function during power failures. "Dying gasp" monitoring, reporting, and detection are provided by optical-layer communication, which can be faster in response.

Although the specification has been particularly shown and described with reference to multiple embodiments, it will be understood by persons skilled in the relevant art that various changes in form and details can be made therein without departing from the spirit and scope of the specification.

DETAILED DESCRIPTION

Figure 1:
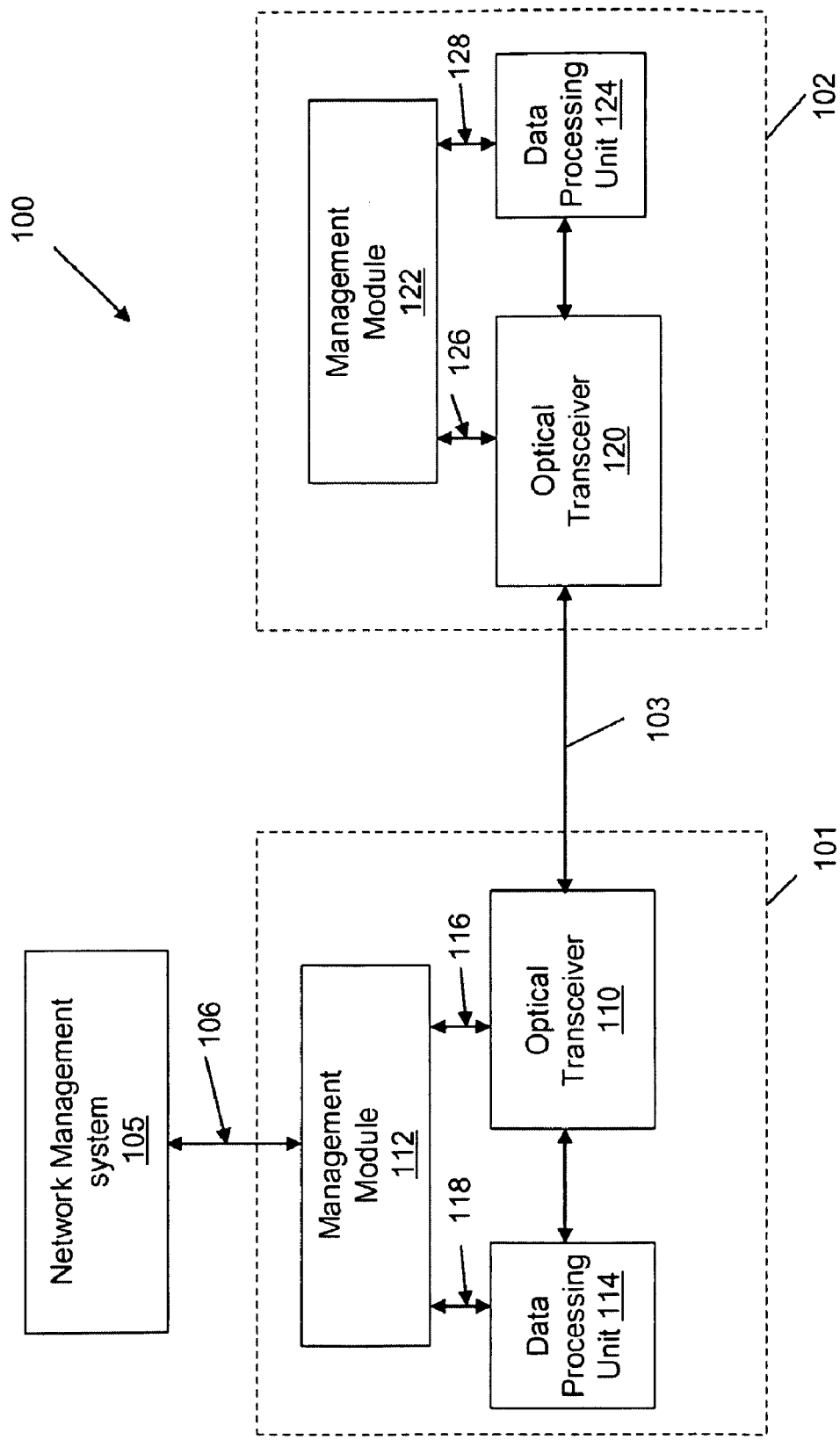
FIG. 1 is a block diagram for an optical network system including a pair of transceivers over a point-to-point fiber link.

Referring to FIG. 1, an optical network system 100 includes network equipment 101 and 102 that are installed at different locations and can communicate in optical signals via an optical link 103. The optical link 103 can for example include a single optical fiber, or a cable containing a bundle of optical fiber. The equipment 101 includes an optical transceiver 110 that is configured to perform conversions between optical and electrical signals, a data processing unit 114 that processes communication signals, and a management module 112 that monitors and controls the functions of the network equipment 101. Similarly, the equipment 102 includes an optical transceiver 120 capable of performing conversions between optical and electrical signals, a data processing unit 124 that processes the communication signals, and a management module 122 that monitors and controls the functions of the network equipment 102. Optionally, a higher level network management system 105 manages entire network system 100.

The optical network system 100 can, for example, be a telecommunication or internet service providers' network. The network equipment 101 can be located at a service provider's central facility and managed by the network management system 105 via the management module 112. The interface 106 between the network management system 105 and the management module 112 can include for example a RS232 consol, an Ethernet poll, and other types of interfaces. The network equipment 102 can be at a remote location such as a customer premise. While the network management system 105 manages the equipment 101 locally, it can only manage the equipment 102 remotely. In some embodiments, in the downstream direction (from the central office to the customer premise), the management information can be transferred through the optical link 103 from network management system 105 to the management module 112, and then sent to the data processing unit 114 via a communication interface 118. The data processing unit 114 processes the downstream management information, and then sends electrical signals comprising both user data and the downstream management information to the optical transceiver 110.

In the present specification, the term "user data" refers to the data that carries information to be communicated between for example the service provider and customers. For example, "user data" can include video data, voice data, and email data communicated between different points in an optical communication network. In contrast to "user data", "management data" is used only by equipment to assure proper operation of the optical network.

The management module 112 can also communicate directly with the optical transceiver 110 via a communication interface 116. The optical transceiver 110 converts downstream electrical signals to downstream optical signals. The optical transceiver 120 receives the downstream optical signals via the optical link 103 and converts the downstream optical signals back to downstream electrical signals. The data processing unit 124 can extract downstream management information from the downstream electrical signals from the optical transceiver 120, and send the downstream management information to the management module 122 via a communication interface 128. In the upstream direction, the upstream management information takes a reverse path from the management module 122 to the network management system 105 via the data processing unit 124, the optical transceiver 120, the optical transceiver 110, the data processing unit 114, and the management module 112.

In the above described arrangement, management data and user data share the bandwidth of the optical link 103 between the network equipment 101 and 102. This communication mode for the management data can be referred to as "in-band" channel. The "in-band" management can be implemented as dedicated management overhead in data frames such as Ethernet OAM. (operation, administration and management), or as a digital wrapper that encapsulates user data. In the latter case, the resulting data rate traversing optical link 103 is higher than the user data rate. An "in-band" channel includes several drawbacks. First, in the case of dedicated management overhead in data frames, the bandwidth for the user data is decreased by the bandwidth allocated to the management data. In case of digital wrapper, a complicated and expensive data processing chip must be added to the system. Secondly, the equipment 101 and the equipment 102 have to be fully interoperable. Interoperability, however, does not always exist between the network equipment 101 and 102*i* because they often have different vintages and of different grades (carrier-grade vs. enterprise grade), and are owned and operated by different parties (e.g. service providers and customers) and maintained by different practices (carrier-grade vs. enterprise grade). To assure interoperability, the industry has installed extra interoperable equipment, owned and maintained by service providers, at customer premises. This practice is costly in both equipment expenditure and operation complexity.

Figure 2:
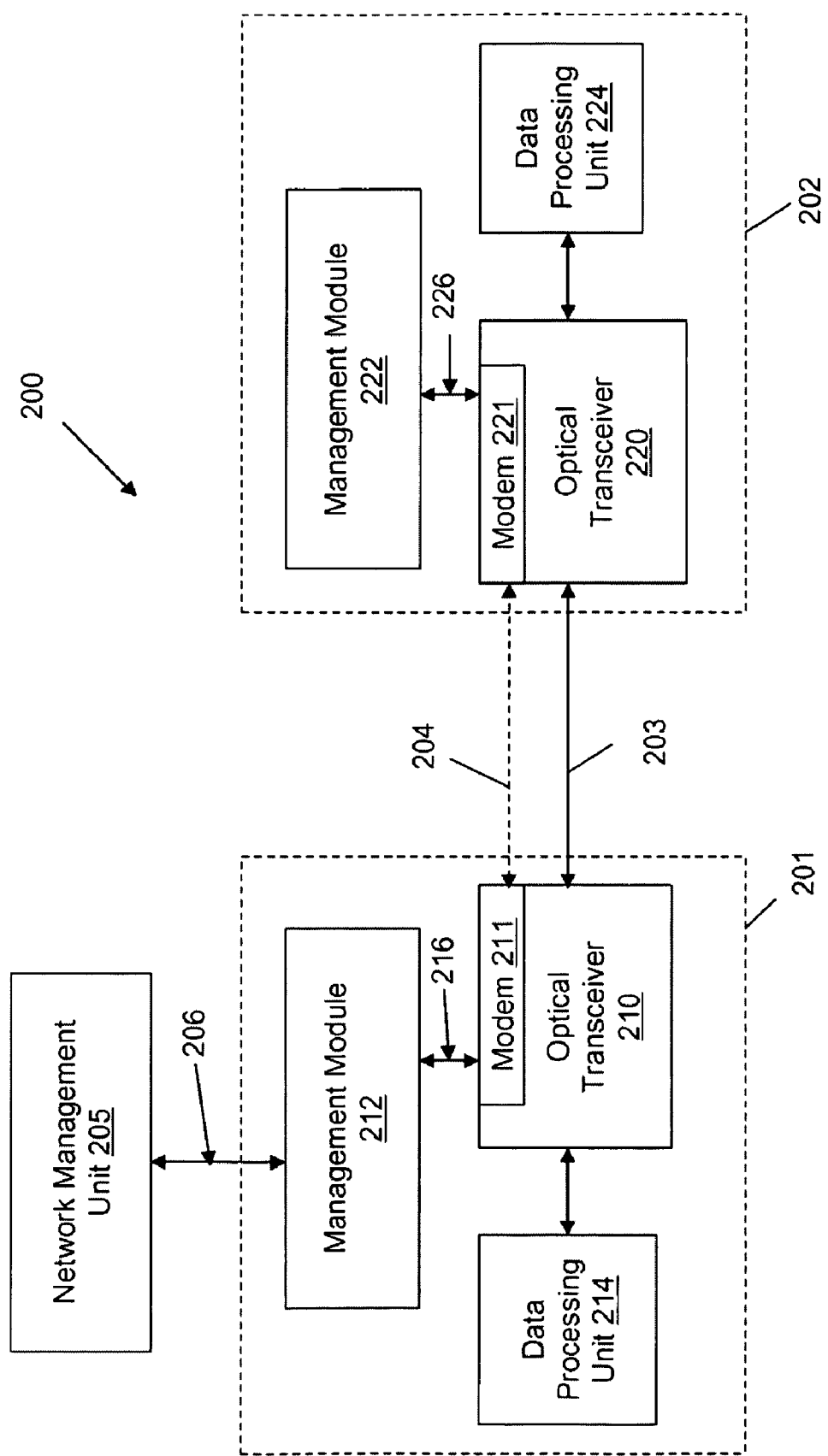
FIG. 2 is a block diagram for an optical network system including smart optical transceivers.

In some embodiments, referring to FIG. 2, an optical communication system 200 includes network equipment 201 and 202 that are installed at different locations and connected via an optical link 203. The equipment 201 includes a smart optical transceiver 210, a data processing unit 214 that processes communication data, and a management module 212 that monitors and controls the network equipment 201. Similarly, the equipment 202 includes a smart optical transceiver 220, a data processing unit 224 that processes communication data, and a management module 222 that monitors and controls the network equipment 202.

The optical transceivers 210 and 220 respectively include modems 211 and 221 that are configured to apply and retrieve non-intrusive modulation on the downstream and upstream data signals between the optical transceivers 210 and 220. The modem 211 and 221 are processing units that can perform modulation and demodulation functions. The modulation and demodulation functions can be implemented as an integrated circuit or software application stored as firmware on a memory. The processing unit can include one or more processing devices.

In the present specification, the term "non-intrusive modulation" refers to a modulation that has negligible impact on user data between optical transceivers in an optical communication system. For example, non-intrusive modulation can include a relatively low frequency small amplitude envelope modulation on optical data signals. Here the envelope refers to the trace of the maximum amplitudes of the optical data signals. The optical data signals can be used as a carrier for a secondary modulation that changes the amplitude of the envelope slowly compared to the bit-rate of the carrier. The amplitudes of the envelope modulation can be kept small relative to the optical signals for user data. It is understood that the small-amplitude envelop modulation of user data signals is only an exemplified implementation. The disclosed system and methods can utilize other modulation and demodulation techniques, such as but not limited to, frequency modulation and phase modulation.

In contrast to the "in-band" communication method described earlier, the modulation and demodulation of the optical signals by the integrated optical modems 211 and 221 has negligible impact on the transmission of user data. Data packets and data rate of the user data stay unchanged through the optical link 203. In other words, the optical modems 211 and 221 can achieve "transparent" or "out-of-band" management in the optical communication system 200 in a manner that is non-intrusive. The link 204 between the optical modems 211 and 221 is a communication channel. The optical transceivers 210 and 220 are referred to as smart optical transceivers in the present specification because they include intelligence that is non-existent in some conventional transceivers.

The optical communication system 200 can be managed by a network management unit 205. Downstream management information in the optical communication system 200 is sent from the network management unit 205 to the management module 212 through a management interface 206. The management interface 206 can be a RS232 consol, an Ethernet poll, or other type of interfaces. The downstream management information is then sent to smart optical transceiver 210 via a communication interface 216, which can be an I²C (inter-integrated circuit) interface. The optical modem 211 in the smart optical transceiver 210 processes the downstream management information. The optical modem 211 then applies a non-intrusive modulation containing management information to the downstream optical signal produced by the smart optical transceiver 210. After traveling through the optical link 203, the downstream optical signal is received by the optical transceiver 220. The optical modem 221 extracts the downstream management information from the downstream optical signal by demodulating the downstream optical signal. The downstream management information is then sent to the management module 222 via a communication interface 226. Similarly, the upstream management information can take a reverse path from the management module 222 to the network management unit 205 via the optical transceiver 220, the optical transceiver 210, and the management module 212. The optical communication system 200 thus has extensive management capabilities that are transparent and non-intrusive to user data.

Management data signal can be generated by the management modules 212, 222 and the optical transceivers 210, 220. The optical transceivers 210 and 220, for example, can periodically report current transmission and reception optical powers, which can be used to analyze link qualities of downstream and upstream fibers. When a significant degradation occurs over time, a warning message can be sent to the network management unit 205. Besides the status monitoring of the optical transceiver 210, 220, the management modules 212, 222 can also monitor other status in the equipment 201, 202. For instance, the operation status of data processing unit 224 can be reported to the network management unit 205 through the non-intrusive management channel.

In some embodiments, the network management unit 205 produces at least a portion of the downstream management signal in response to the upstream management signal extracted by the modem 211. For example, when the equipment 202 is first powered up and connected to the equipment 201, the management module 222 can generate registration request information and send it to modem 211 through the link 204. The registration request information is extracted by the modem 211 and sent to the network management unit 205, which produces an acknowledge message to be returned to the management module 222.

The optical communication system 200 provides communication channels for management data in the optical layer (or Layer 1) without the need of transferring and processing management data in upper layers. The optical communication system 200 and other disclosed systems and methods can thus provide "optical layer management", that is, management data are generated, processed, and transported at optical layer. Optical layer management does not cause changes to the transmission of user data. For instance, the transmission speed, data format, and contents (overhead and payload) of the user data are not affected by the presence of optical layer management.

The network equipment at the central office and the optical cables are usually owned by the service providers. The network equipment at the remote site is often owned and managed by customers. Network management and status monitoring can become difficult when the two pieces of network equipment are owned and, operated by separate parties, and have different level of compliance to the "in-band" management standards. More importantly, the cost of network maintenance is high because of many "truck rolls" (which refers to the dispatch of service technicians, with necessary diagnostic tools, equipment, and sparing parts to field or customer premises for locating and fixing problems). When a network problem arises, it is desirable for service provider personnel to be alerted by or have accesses to the network management system from service provider's facilities so that failure points and causes can be determined. In other words, it is desirable for the service providers to be able to monitor and diagnose not only the equipment located at service providers' facilities, but also the equipment at customer premises.

In some cases, set-vice providers can deploy demarcation equipment at customer premises to achieve the needed remote manageability. Demarcation equipment is a network terminal equipment (NTE) that is owned by set-vice provider, can thereby communicate with equipment located at service provider's facility with full interoperability. Management data can be inserted into and retrieved from user data by the demarcation equipment. Demarcation equipment, while adding costs, can help manage the optical network, reduce operational expenditure and enforce SLA.

The disclosed smart optical transceivers can eliminate the need for such demarcation equipment, thus providing simplicity, flexibility, and lowered costs in the construction and maintenance of the optical communication network. In some embodiments, referring to FIG. 3, an optical communication system 300 includes a network equipment 201 located at a service provider's facility, a pluggable smart optical transceiver 320 plugged into a network equipment 302 that is located at a remote site such as a customer premise. The pluggable optical transceiver 320 is capable of communicating with the network equipment 302 via an electrical interface 322. For example, the network equipment 302 can be an enterprise Ethernet switch. The pluggable optical transceiver 320 can be an SFP (small form-factor pluggable) optical transceiver that includes an integrated modem as described above and can be plugged into a standard SFP socket on the enterprise Ethernet switch. In this case, the electrical, optical, mechanical and control interfaces of the optical transceiver comply with the MSA (multi-source agreement) specifications. The smart optical transceiver can be made to be compliant with other industry standards and specifications such as GBIC, SFF, SFP, XFP, X2, XENPAK and SFP+.

The network equipment 201 includes a smart optical transceiver 210, a data processing unit 214 that processes communication data, and a management module 212 that monitors and controls the network equipment 301. The smart optical transceiver 210 is in optical communication with the pluggable optical transceiver 320 via optical link 203. The smart optical transceiver 210 includes a modem 211 and the pluggable optical transceiver 320 includes a modem 321. In some embodiments, the optical transceiver 210 can also be pluggable to network equipment at a central office. As described above, the management of the network equipment 201 and the network equipment 302 can be communicated through the modems 211 and 321 through the non-intrusive management channel 204. In some embodiments, the management data can be carried by relatively low speed and relatively small amplitude envelope modulation of optical signals carrying the user data, and retrieved by demodulation of the envelope modulation. While the smart optical transceiver 320 is accessible and managed by the network management unit 205, the network equipment 302 at the remote site can be accessible to the network management unit 205.

Management data signals in the optical communication system 300 can be generated by various communication devices or components such as the network management unit 205, the management module 212, the smart optical transceiver 210, and the pluggable optical transceiver 320. The equipment 302, a host of the pluggable optical transceiver 320, may be owned by a different party. As described above, the equipment 302 does not need to take part in optical layer management. Thus, no interoperability is required between the equipment 302 and the network equipment 201. The optical communication system 300 can provide optical layer OAM cost effectively without requiring demarcation equipment or full interoperability with the network equipment at the customer premises.

In some embodiments, the mechanical, optical, and electrical interface 322 of the pluggable optical transceiver 320 complies with standard MSA specifications such as GBIC, SFP, XFP, X2, XENPAK, and SFP+, etc. It allows optical management to be implemented without altering the network equipment 302. In some embodiments, the pluggable optical transceiver 320 can be a device without its own power supply. The pluggable optical transceiver 320 can receive power at its standard pins electrical interface 322 from the network equipment 302.

Figure 3:
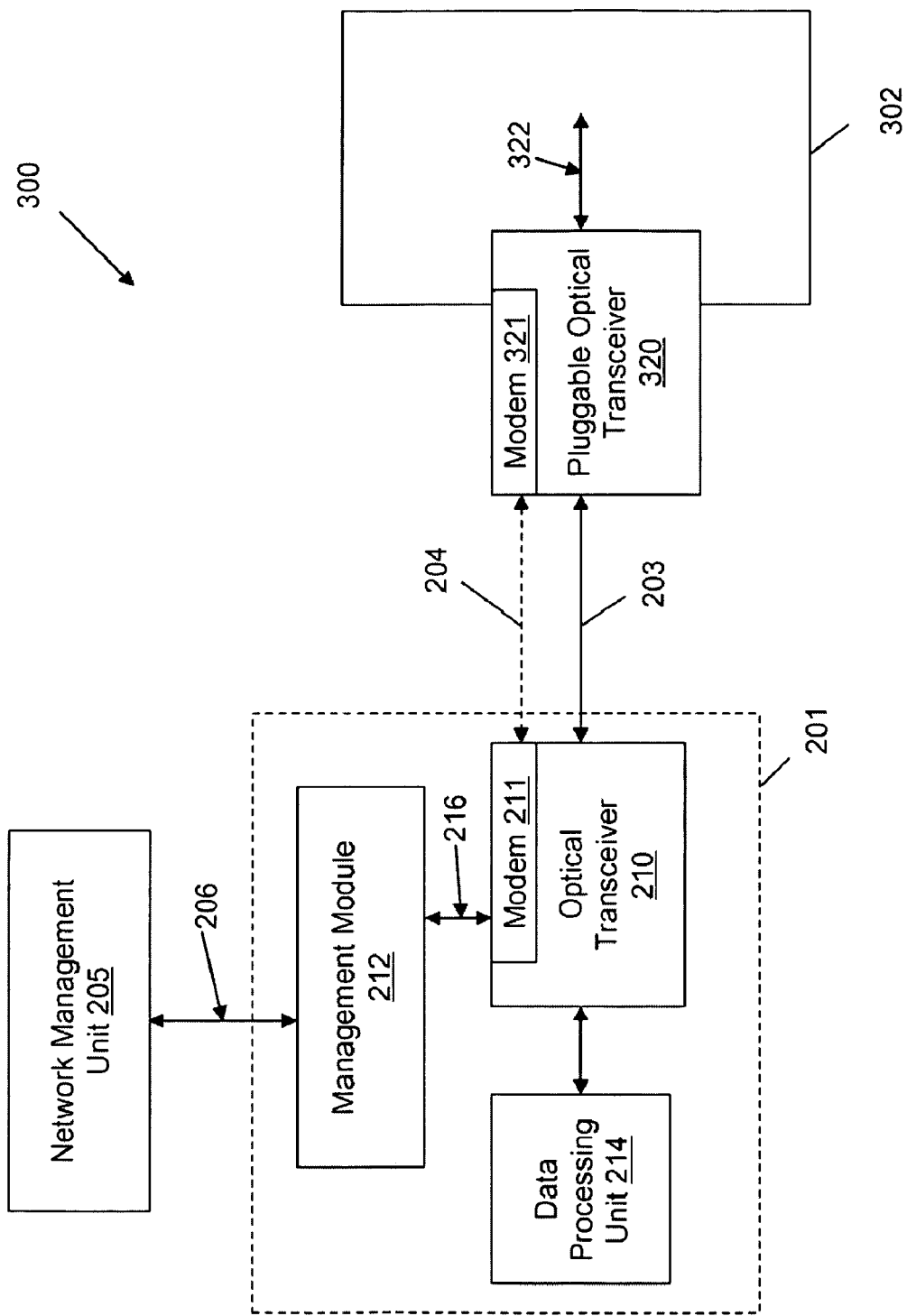
FIG. 3 illustrates an exemplified optical network system having pluggable smart optical transceivers.
Figure 4:
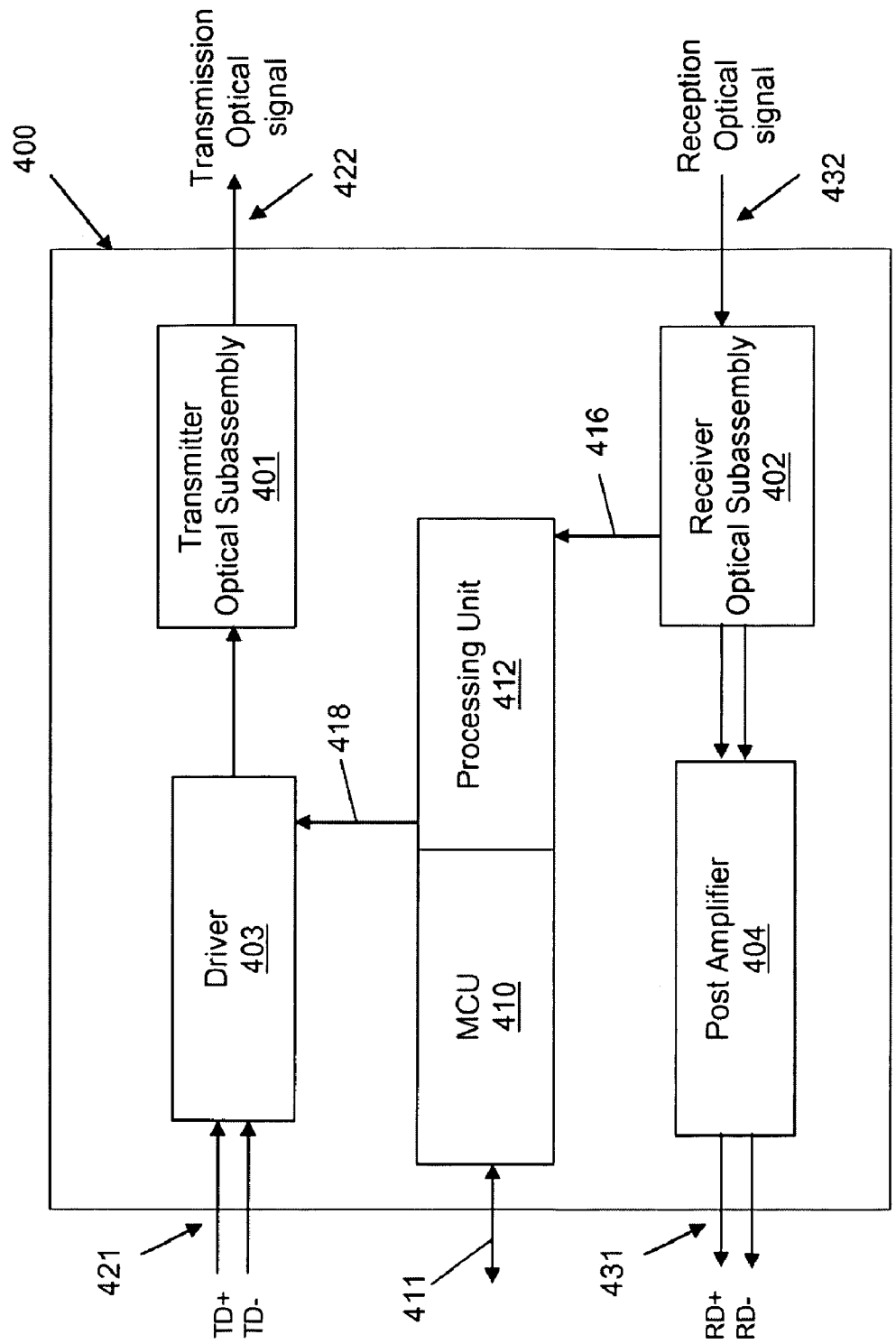
FIG. 4 is an exemplified block diagram of a smart optical transceiver having integrated optical-layer management capability.

FIG. 4 illustrates a smart optical transceiver 400 having non-intrusive management channel capabilities, which is compatible with the optical transceivers 210, 220, and 320 in the optical communication systems 200 and 300. A driver 403 such as a laser driver receives differential data signals TD+ and TD− carrying user data for transmission at a transmission electrical interface 421. A transmitter optical subassembly (TOSA) 401 can emit optical output signals at a transmission optical interface 422 driven by the driver 403. A reception optical signal at a reception optical interface 432 can be converted to reception electrical signals by a receiver optical subassembly (ROSA) 402 and further amplified by a post amplifier 404 to output differential data signals RD+ and RD− at a reception electrical interface 431. A micro controller unit (MCU) 410 can monitor and control the operation of the optical transceiver 400. The MCU 410 can output status and other signals and receive control signals at an interface 411. A processing unit 412 is integrated inside the optical transceiver 400 to facilitate the non-intrusive optical-layer management communication with another remote optical transceiver, as discussed above in relation to FIGS. 2 and 3. In some embodiments, the processing unit 412 can be implemented as a modem integrated inside the transceiver 400. In some embodiments, the processing unit 412 and the MCU 410 can be implemented as a modem integrated inside the transceiver 400. The processing unit 412 can either be implemented as an electric circuit or implemented fully or partially by software stored in computer memories such as firmware. The processing unit 412 is closely connected with the MCU 410 to facilitate fast transfer of the management data to the MCU 410 for data processing. The processing unit 412 is in communication with the driver 403. It should be understood that the transmission signal received by the driver and the reception signals output by the post amplifier are not limited to differential signals. Both signals can also be compatible with single-ended signals.

In the transmission path, the processing unit 412 can send modulation control signal 418 containing management information to the driver 403. Usually the modulation control signal 418 is preferably a low speed signal, for example, a few tens kilobit per second comparing to transmission user data received at the transmission electrical interface 421, which can be more than one gigabit per second. In some embodiments, the modulation control signal 418 can modulate bias voltage or current in the driver 403 to produce a low speed and small amplitude envelope modulation over the differential data signals (TD+ and TD−). In the reception path, the ROSA 402 can send a signal 416 to the processing unit 412 in response to the reception optical signal. A low speed and small amplitude modulation in the reception optical signal 416 can carry the management data. Usually signal 416 is a low speed signal for example a few tens kilobit per second comparing to reception electrical user data output signal form the ROSA 402, which can be more than one gigabit per second. For example, the signal 416 can be a minor photo-current signal produced at the ROSA 402. The processing unit 412 can demodulate the signal 416 and extracts the management data. Thus, the smart optical transceiver 400 has the capability to transmit and receive non-intrusive management data. The extracted management data can be processed by MCU 410 or passed to host equipment for the optical transceiver 400 through the interface 411. For example, the optical transceiver 400 can be used in place of the optical transceiver 210 in the optical communication system 200 or 300. The optical transceiver 400 can be at an OLT (optical line terminal) located at service provider's facility. The management data can be sent out through the interface 216 and processed by the management module 212. In another example, the optical transceiver 400 can be located at a remote position away from the service provider's facility. The optical transceiver 400 can be a pluggable optical transceiver connected to third party equipment as shown in FIG. 3. The MCU 410 can perform as the central unit of processing and generating management data.

It should be understood that the disclosed optical transceiver can include components other than the ones described above in the optical transceiver 400. For instance, the disclosed optical transceiver can include functional blocks such as CDR (clock data recovery), SerDes (Serializer Deserializer), and other functional blocks. Moreover, the driver 403 can be a laser diver chip or an external modulator that can modulate continuous wave optical signals from TOSA 401.

It should be understood that the functional blocks and components in the optical transceiver 400 can be separate physical devices. Several functional blocks can be integrated into an unitary device. For example, the transmitter optical subassembly 401 and the receiver optical subassembly 402 can be integrated in a bidirectional optical subassembly (BOSA) with a bidirectional optical interface that can output transmission optical signal 422 and receive reception optical signal 432.

Figure 5:
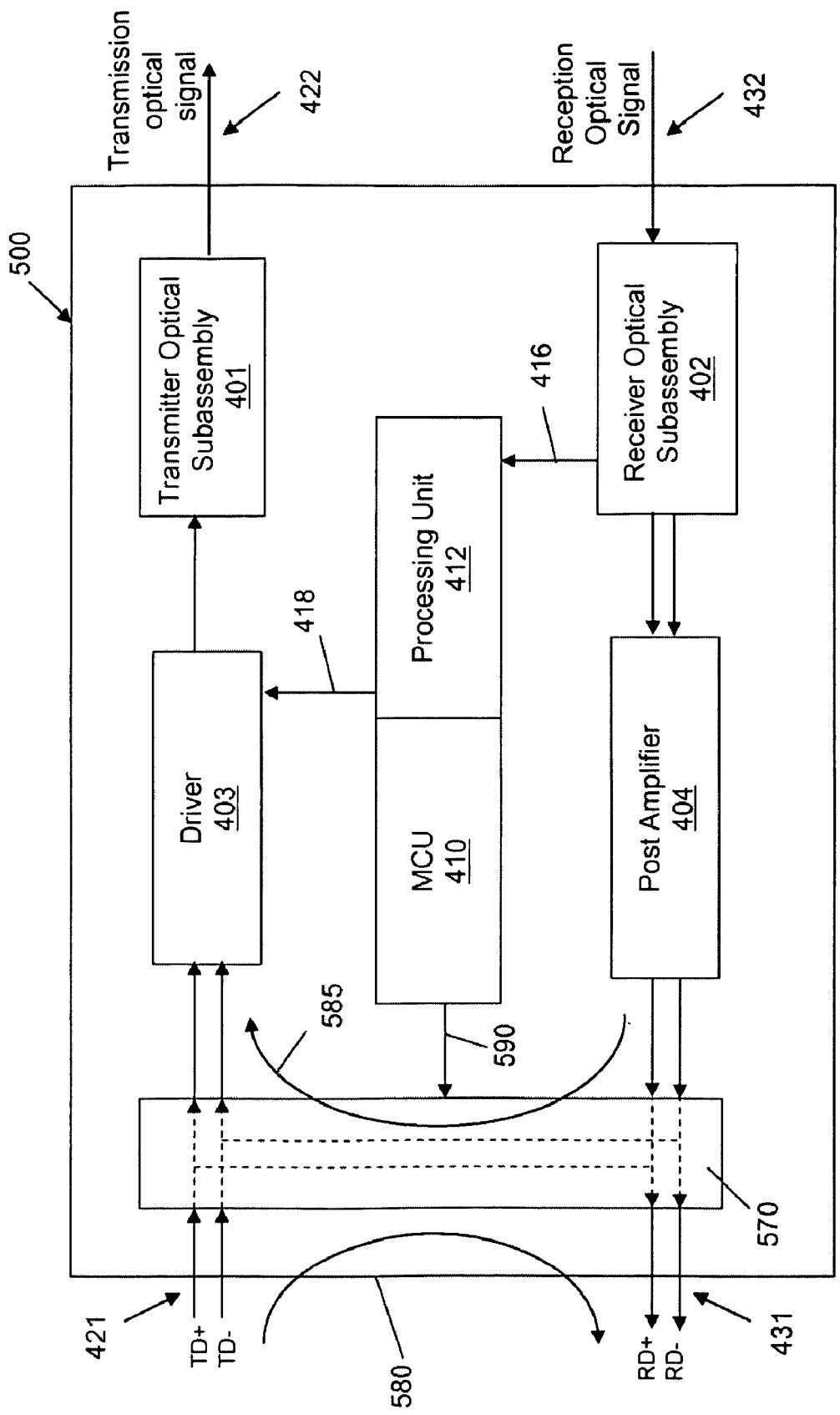
FIG. 5 is an exemplified block diagram of a smart optical transceiver having integrated optical-layer management capability and data loop-back function.

Data loop-back test is a useful tool for a service provider to debug and locate network's failure modes. It can help service providers to avoid unnecessary "truck rolls" and reduce operational expenditure. FIG. 5 illustrates a smart optical transceiver 500 compatible with the optical transceivers 210, 220, and 320 in the optical communication systems 200 and 300. The smart optical transceiver 500 includes non-intrusive management channel similar to the above-described in relation with the smart optical transceiver 400. The smart optical transceiver 500 includes an integrated loop-back controller 570 that can receive differential data signals (TD+, TD−) for transmission at a transmission electrical interface 421. The loop-back controller 570 can also output reception data (RD+, RD−) at a reception electrical interface 431. The loop-back controller 570 can work under default bypass condition, in which the differential data signals (TD+, TD−) for transmission are directly passed to the driver 403 and the reception data (RD+, RD−) are also directly transmitted from the post amplifier 404.

The MCU 410 can output status signals and receive control signals at an interface 411 to the outside (not shown in FIG. 5). The MCU 410 can send a control signal 590 to control the loop-back controller 570 to different loop-back modes including local loop back and remote loop back. In the local loop-back mode, differential data (TD+, TD−) for transmission are routed inside loop-back controller 570 back to the reception electrical interface (along path 580). The routed back signals can be used to verify the proper operation of network equipment into which the smart optical transceiver 500 is plugged. In the remote loop-back mode, the output of the post amplifier 404 is routed back to the driver 403 through the loop-back controller 570 (along path 585). The driver 403 and the TOSA 401 can produce a transmission optical signal that replicates the reception optical signal received at the reception optical interface 432. The replicated optical signals in the remote loop-back mode can allow a service provider to remotely verify the working conditions of to and from the optical transceiver 500, and the optical transceiver 500 itself.

Figure 6A:
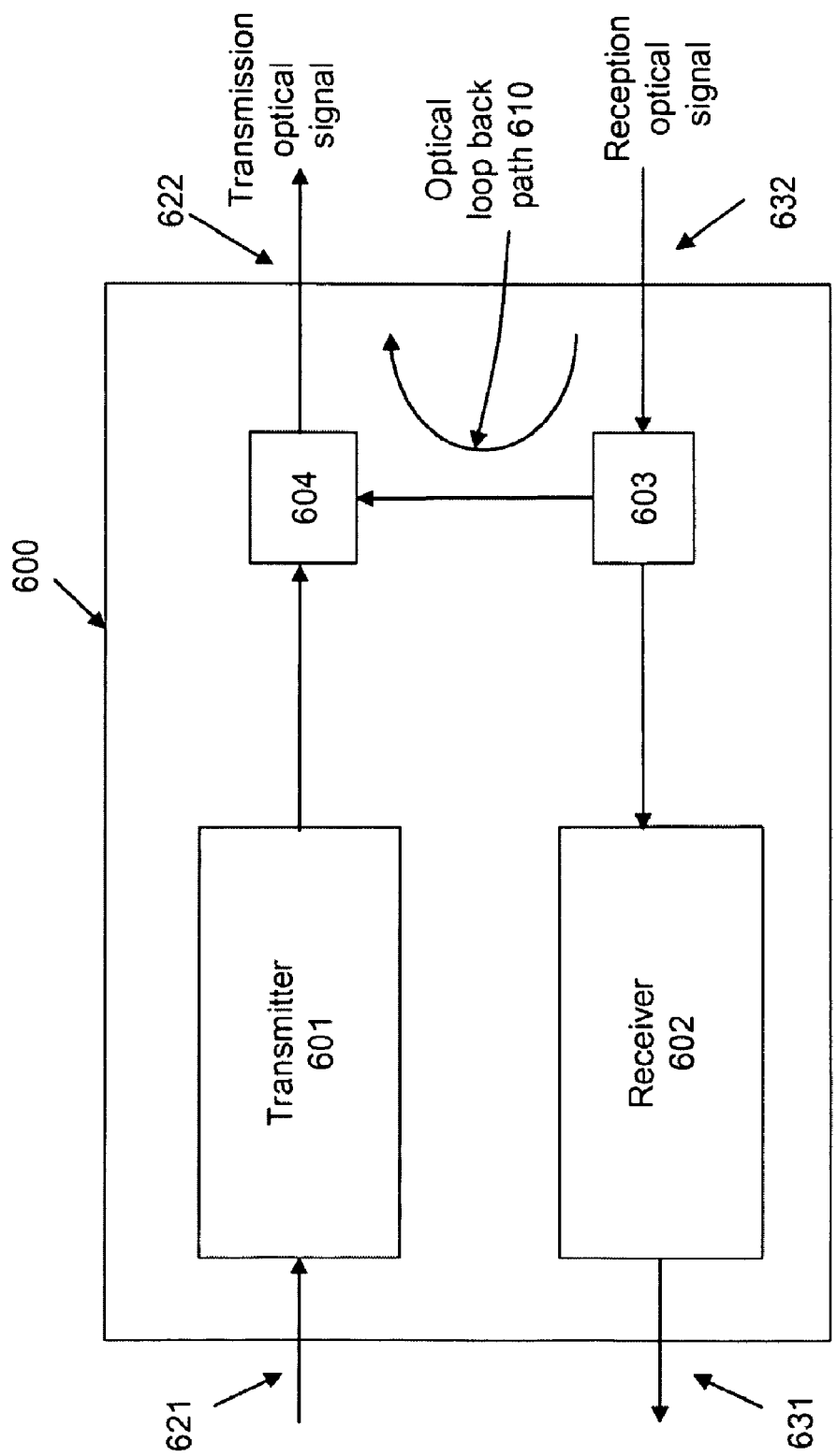
FIG. 6A is an exemplified block diagram of a smart optical transceiver having integrated optical-layer management capability and optical loop-back function.

In some embodiments, the above described smart optical transceivers, systems and methods can be further enhanced by optical loop-back capability. Referring to a smart optical transceiver 600 in FIG. 6A, a transmitter 601 is configured to receive a transmission electrical signal at a transmission electrical interface 621 and to emit a transmission optical signal. A branching optical device 604 can output the transmission optical signal to a transmission optical interface 622. A branching optical device 603 is configured to receive a reception optical signal at a reception optical interface 632. A receiver 602 converts the reception optical received from the branching optical device 603 to a reception electrical signal at the reception electrical interface 631. Suitable implementations for the branching optical devices 603 and 604 include splitters, switches, variable optical attenuators, and other optical branching devices. A loop-back path 610 is provided from the branching optical device 603 to the branching optical device 604. Under normal operation conditions, the loop-back path 610 is either open or very lossy. The intensity of the optical loop-back signal is negligibly small compared to the transmission optical signal emitted by the transmitter 601. In a diagnostic mode, at least a portion of the reception optical signal is routed back through the optical loop-back path 610: from the branching optical device 603, to the branching optical device 604, and then to the transmission optical interface 622. The transmitter 601 is either disabled or its optical output is blocked by the branching optical device 604. The routed-back reception optical signal can be received by an optical device at different location to be used for remote testing the integrity of optical link connected to the smart optical transceiver 600.

The branching optical devices 603 and 604 can be implemented by passive optical devices. The optical loop back allows remote testing of optical links when data loop-back function is unavailable (e.g. during power failure). The branching optical devices 603 and 604 can be integrated with the transmitter 601 and the receiver 602 in the optical transceiver 600 to form a unitary optical subassembly (OSA). The unitary OSA can comply with various standard formats or specification for optical transceivers, including but not limited to, GBIC, SFP, XFP, X2, XENPAK, and SFP+. The transmission electrical interface 621 and the reception electrical interface 631 can thus be plugged into host network equipment based on these standard interfaces. The transmission optical interface 622 and the reception optical interface 632 are configured to be connected to optical fibers to allow optical communications with a remote site.

Figure 6B:
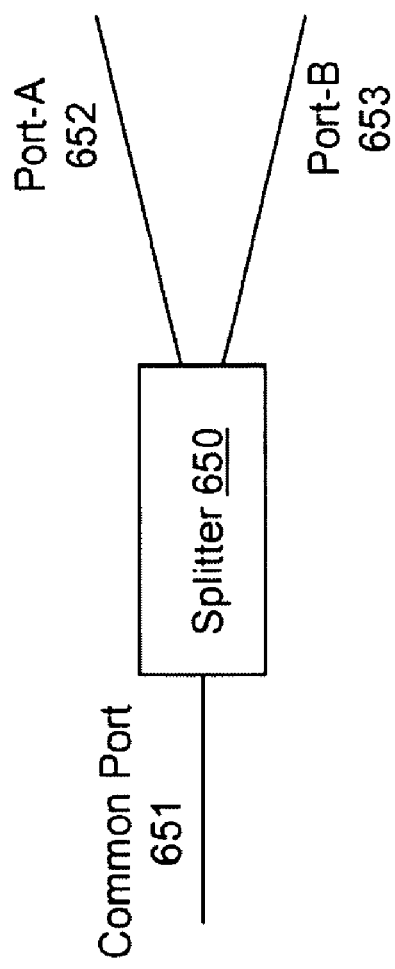
FIGS. 6B and 6C illustrate exemplified branching optical devices compatible with the smart optical transceiver in FIG. 6A.

The branching optical devices 603 and 604 can be implemented by optical power splitters (i.e. directional optical couplers). As shown in FIG. 6B, a splitter 650 includes three optical ports: a common port 651, an optical branching port A 652, and an optical branching port B 653. An optical signal received at the common port 651 can be directed to the branching port-A 652 and branching port-B 653 at certain split ratio. Conversely, optical signal received at the branching port-A 652 and branching port-B 653 can be combined at a combining ratio to output at the common port 651. The split ratio and combining ratios can vary in accordance to the construction of the splitter 650. Optical cross-talk between the branching port-A 652 and the branching port-B 653 can be minimized such that the branching port-A 652 and the branching port-B 653 can be considered isolated. The splitter 650 can be implemented as a device without using a power supply. When applied to the optical branching device 603 in the smart optical transceiver 600, the common port 651 receives the reception optical signal from the reception optical interface 632. The branching port-A 652 and the branching port-B 653 are respectively connected to the receiver 602 and the optical branching device 604. When applied to the optical branching device 604, the common port 651 is connected to the transmission optical interface 622. The branching port-A 652 and the branching port-B 653 are respectively connected to the transceiver 601 for receiving transmission optical signal, and to the optical branching device 603 for receiving the reception optical signal. The split ratio between the branching port-A 652 and the branching port-B 653 for the optical branching devices 602 and 604 are designed to provide strong enough optical loop-back signal for remote diagnostic detection while minimizing noise to the transmission and reception optical signals under normal operation conditions.

Figure 6C:
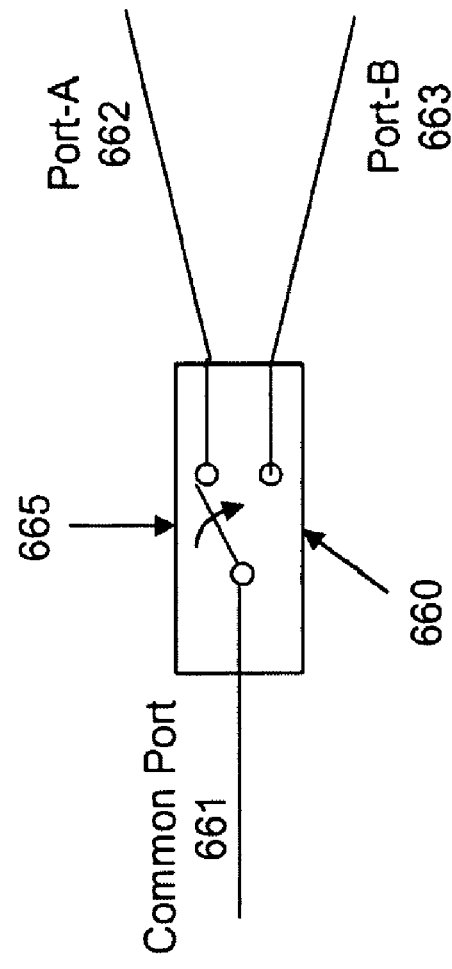

FIG. 6C shows another implementation for the branching optical devices 603 and 604. An optical switch 660 includes a common port 661, a branching port-A 662, and a branching port-B 663. The common port 661 can be switched to either the branching port-A 662 or the branching port-B 663 under the control of a control signal 665. An exemplified implementation of the optical switch 660 is a 1×2 optical switch. The implementations of the optical switch 660 in the branching optical devices 603 and 604 are similar to the description above in relation to the splitter 650. In addition, the optical switch 660 can be an active device that receives external power to operate. In case of power failure, it can automatically restore to a default state such that an optical loop-back path is established for remote testing.

Equipment power failure is one of the most common errors in optical networks. Power failures often occur in equipment located at remote sites. "Dying gasp" refers to a function that reports a power supply problem through the optical network from a remote site. "Dying gasp" can be conducted, for example via Ethernet OAM (operation administration and management) in the optical network. The conventional "dying gasp", such as the one defined in IEEE specification, requires interoperability between the equipment at the failure end and the detecting end of the optical connection. In practice, interoperability is often achieved by deploying additional demarcation equipment at the remote site, which requires additional equipment and labor costs.

Figure 7:
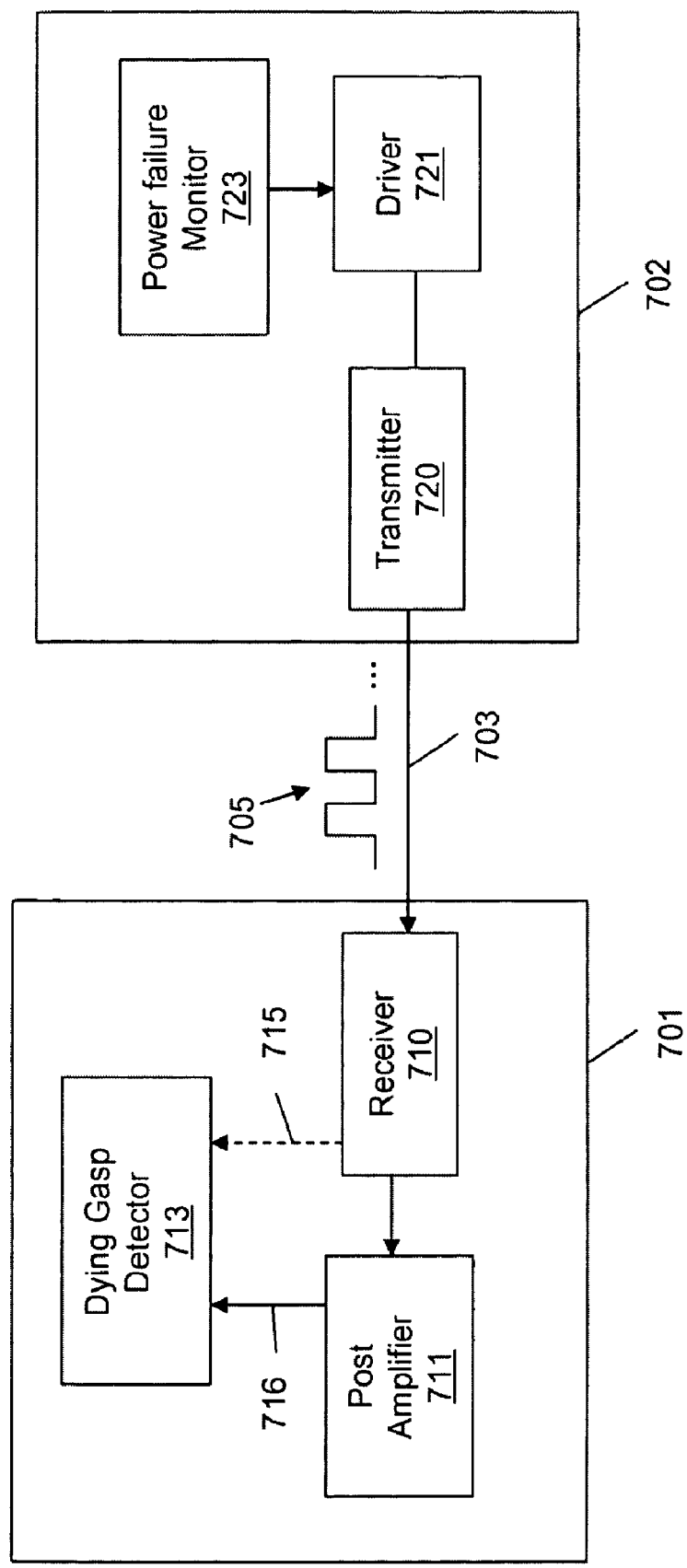
FIG. 7 illustrates an exemplified implementation of a "dying gasp" monitoring at optical layer in an optical network system.

In some embodiments, as shown in FIG. 7, a "dying gasp" function can be implemented in the optical layer between smart optical transceivers 701 and 702 connected by an optical link 703. The smart optical transceiver 701 is located at service provider's office. The smart optical transceiver 702 can be located at a remote site such as a customer's premise. The optical transceiver 701 includes a receiver 710, a post amplifier 711, and a dying gasp detector 713. The optical transceiver 702 includes a transmitter 720, a driver 721, and a power failure monitor 723.

When a power failure is imminent at the remote optical transceiver 702, the power failure monitor 723 detects the problem. Before the power supply drops below a threshold level for normal operation of the optical transceiver 702, the power failure monitor 723 sends a signal to the driver 721, which drives the transmitter 720 to send a pre-defined "dying gasp" signal 705 via the optical link 703. The receiver 710 in the optical transceiver 701 picks up the pre-defined "dying gasp" signal 705 and outputs a mirror photo current 715 that contains the "dying gasp" signal 705. The pre-defined "dying gasp" signal 705 can be implemented by optical envelop modulation, optical output on/off toggling, and other modulation schemes. The smart optical transceivers 701 can further include a processing unit configured to demodulate the electrical signal to extract the dying-gasp signal. The dying gasp detector 713 detects the "dying gasp" event in the mirror photo current 715. Alternatively, the post amplifier 711 receives the reception electrical signal from the receiver 710 and sends a loss of signal (LOS) 716 to the dying gasp detector 713, wherein the "dying gasp" event is detected. The dying gasp detector 713 can be implemented by an electric circuit or software stored in computer memories such as firmware. The detection of "dying gasp" described above can be implemented in optical layer independent of Layer 2 and the format of customer data in the transmission and the reception paths.

Figure 8:
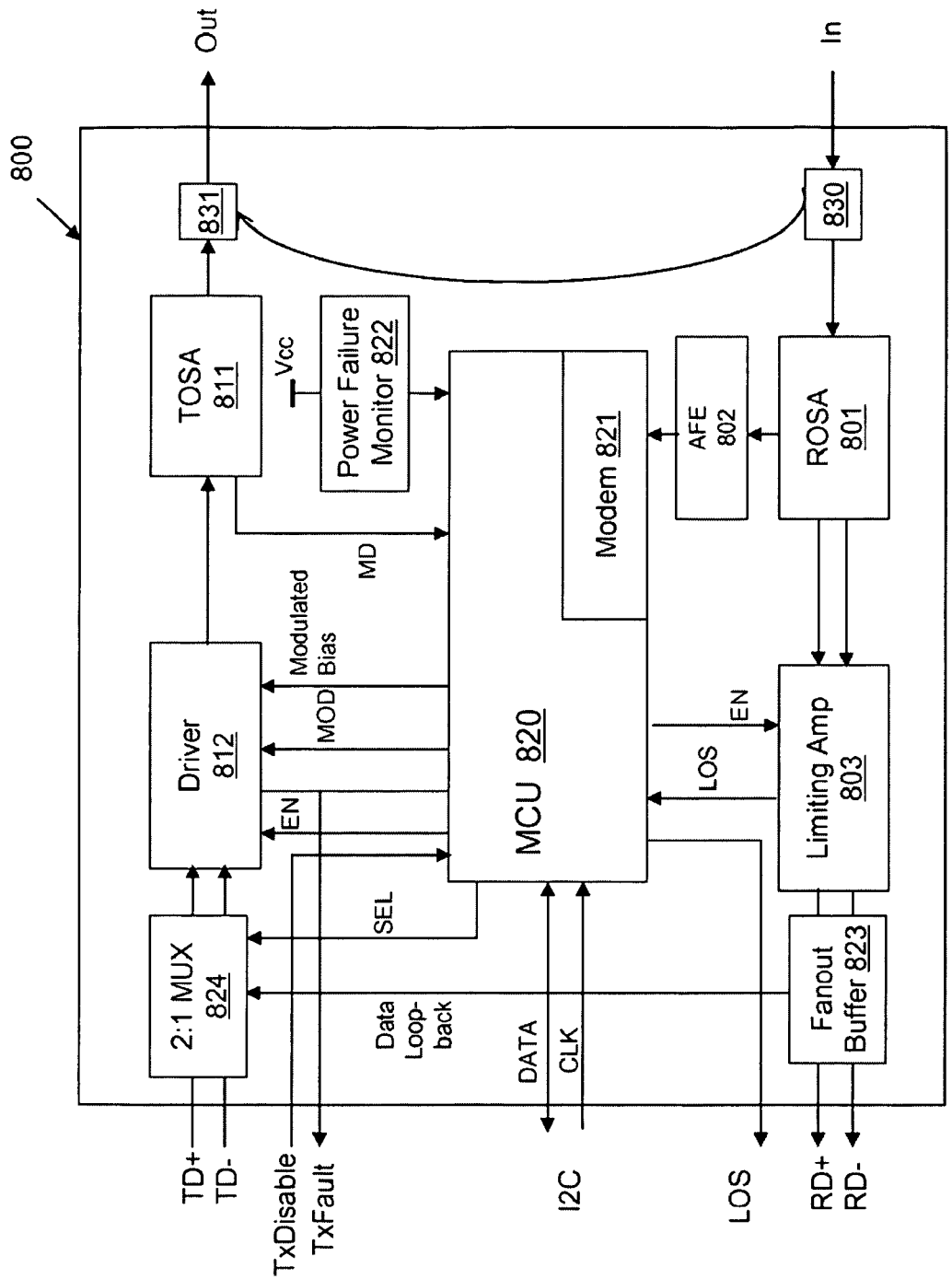
FIG. 8 is an exemplified block diagram of a smart SFP transceiver having integrated optical-layer management capability and other diagnostic functions, such as remote data loop-back, optical loop-back, and dying gasp.

An exemplary detailed block diagram for a smart optical transceiver 800 is shown in FIG. 8. The optical transceiver 800 can be implemented as a pluggable transceiver in a format widely accepted under multiple source agreements (MSA) in optical network industry. For example, the optical transceiver 800 can be compatible with GBIC, SFP, XFP, X2, XENPAK, and SFP+.

The optical transceiver 800 can include optical branching devices 830 and 831 configured to provide optical loop-back function as described earlier in relation to the optical transceiver 600. A major portion of input optical signal is coupled through the optical branching device 830 to a ROSA 801. A major portion of output power from the optical branching device 831 is from the TOSA 811. When implemented with splitters, the optical branching devices can have different split and combination ratios. For example, the optical branching devices 830 and 831 can respectively have 10% split and combining ratios to result in a 1% if the optical input power to be fed back by the optical loop back. A MCU 820 can process and control communication management, and communicate status and control signals (TxDisable, TxFualt, LOS . . . ) externally at an I2C interface.

On the data receiving path, input optical signal passing through the optical branching device 830 is converted to differential electrical signals by the ROSA 801. Then the differential electrical signals are further amplified by a limiting amplifier 803 and sent to a Fanout Buffer 823 which outputs data RD+/−. The Fanout Buffer 823 also outputs data to data loop-back path.

On the data transmission path, input differential data signal TD+/− is received by a 2×1 MUX 824. The 2×1 MUX 824 sends either TD+/− or the loop-back data from Fanout Buffer 803 a driver 812 under the control of a SEL signal from the MCU 820. Accordingly, the driver 812 drives a TOSA 811 to emit a transmission optical signal that can comprise user data or loop-back data. The driver 812 is enabled by an enable signal from the MCU 820. The output from the optical branching device 831 includes a combination of the signal from the TOSA 811 and the optical loop-back signal from the optical branching device 830.

Management data are transmitted in different paths. The ROSA 801 has a mirror photo current output containing received management data carried in the reception optical signal. An APE (analog front end) 802 converts the mirror photon current to an amplified voltage signal to input to a modem 821 that can be embedded in the MCU 820. In order to operate under a wide power range of reception optical signal, the AFE 802 can automatically, adjust amplification under the control of the modem 821. The modem 821 can be implemented by firmware or software to utilize the hardware resources of MCU 820. The modem 821 can digitize received signals, extract management data based on predetermined algorithms, and apply envelope modulation onto output optical signal. In one implementation, a modulated bias signal is from the MCU 820 to the driver 812 to produce a variation in the bias current, which can in turn produce modulation in the amplitude of the output optical signal through the optical branching device 831.

Still referring to FIG. 8, a power-failure monitor 822 can generate an event signal in real-time whenever power supply VCC falls below a predetermined threshold. Triggered by the event signal, the MCU 820 immediately sends out an "optical dying gasp" in a predetermined command pattern. The "optical dying gasp" can be sent out by either modulating bias-current or simply turning laser on and off through the enable control signal EN. The "optical dying gasp" signal must be sent timely before the power supply falls to a point wherein the optical transceiver 800 fails to function. For example, if Vcc is about 3.3 volts, power monitor threshold can be set at 3.0 volt. The minimum operation voltage for the optical transceiver 800 is 2.5 volts. The optical dying gasp signaling process should be completed after Vcc falls below 3.0 volts but before it reaches 2.5 volts.

In sum, the above described "dying gasp" monitoring, reporting, and detection implemented in optical layer are more straightforward and have faster responses than some conventional "dying gasp" systems.

Figure 9:
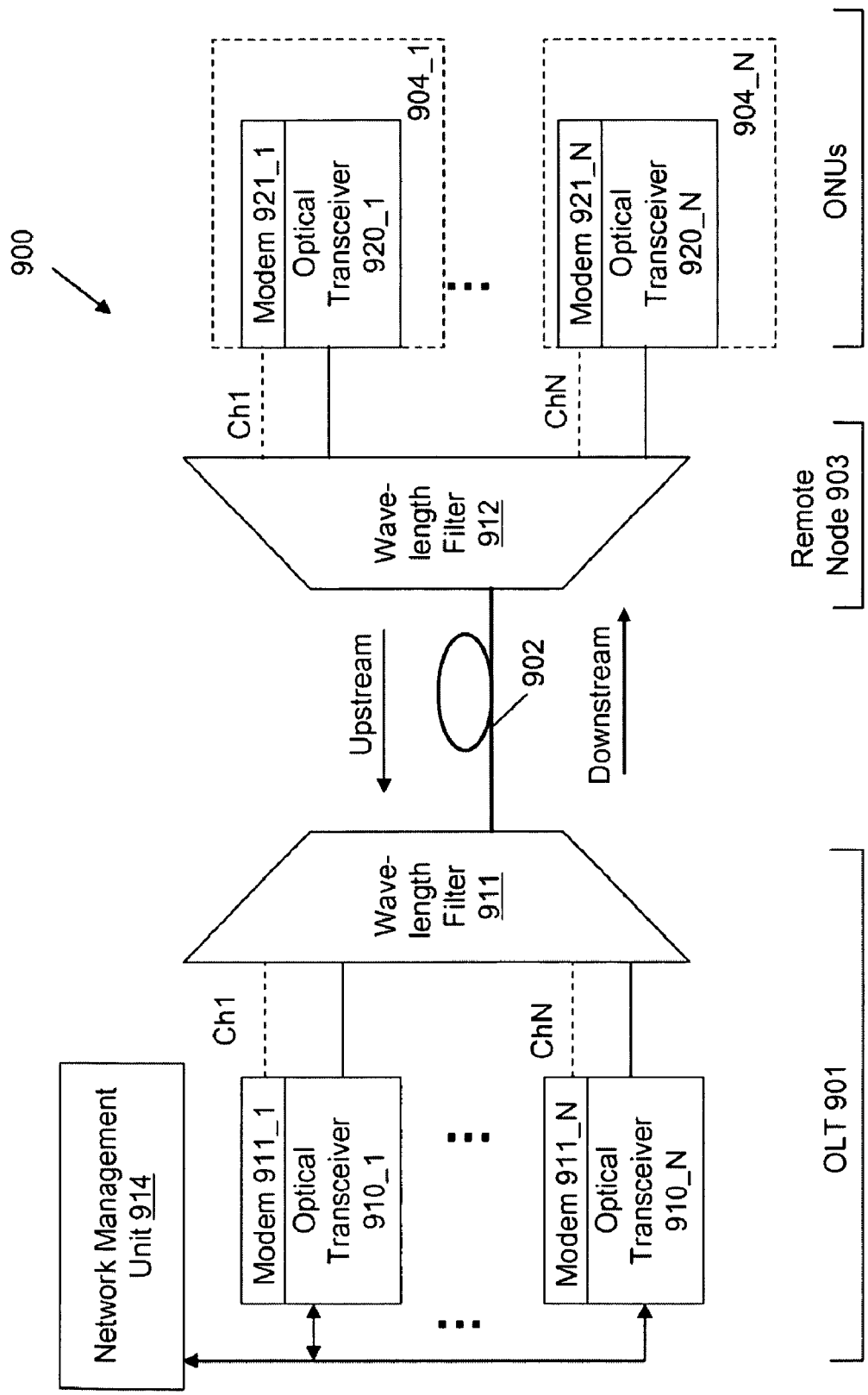
FIG. 9 illustrates a multi-channel optical network system comprising smart optical transceivers capable of optical-layer management.

In some embodiments, the above disclosed systems and methods about optical layer management and smart optical transceivers (in FIGS. 1-8) can be implemented in an multi-channel optical network. Referring to FIG. 9, an optical network system 900 includes a wavelength filter 911 in an optical line terminal (OLT) 901 and a wavelength filter 912 at a remote node 903. Examples for the wavelength filter 911 and the wavelength filter 912 include wavelength division multiplexing (WDM) filters, which can for example be implemented by arrayed-waveguide gratings (AWG), thin-film DWDM (dense division multiplexing) filter, and thin-film CWDM (coarse division multiplexing) filter.

Each of the wavelength filters 911 and 912 includes one or more common ports. The common ports of the wavelength filter 911 and 912 are connected by an optical link 902, which can be formed by a single optical fiber, or a cable containing a bundle of optical fiber. The wavelength filter 911 and 912 each also includes a plurality of symmetric branching ports that respectively communicate different wavelength channels "Ch1", "Ch2" . . . "Ch N". The branching ports of wavelength filter 911 at the OLT 901 are connected to a plurality of smart optical transceivers 910_1, 910_2 . . . 910_N. The smart optical transceivers 910_1, 910_2 . . . or 910_N respectively includes a modem 911_1, 911_2 . . . or 911_N that can be integrated in its associated optical transceivers. The smart optical transceivers 910_1, 910_2 . . . 910_N can be plugged into network equipment located the OLT 901. The OLT 901 also includes a network management unit 914 in communication with the smart optical transceivers 910_1, 910_2 . . . 910_N. Similarly, the branching ports of the wavelength filter 912 at the remote node 903 are connected to a plurality of smart optical transceivers 920_1, 920_2 . . . 920_N respectively at different optical network units (ONUs) 904_1, 904_2 . . . 904_N. The ONUs 904_1, 904_2 . . . 904_N are typically distributed at different locations. The smart optical transceivers 920_1, 920_2 . . . 920_N can be plugged into network equipment located different ONUs 904_1, 904_2 . . . 904_N. The smart optical transceivers 920_1, 920_2 . . . 920_N respectively include modems 921_1, 921_2 . . . or 921_N that can be integrated in their associated optical transceivers.

The optical network system 900 is capable of providing communications between a single point and multiple points (e.g. between OLT and ONUs) and in different communication channels. The communication channels can be dedicated between two points and are independent from other channels. For example, the communications in channel 1 (i.e. "Ch1") between the smart optical transceiver 910_1 in the OLT 901 and the smart optical transceiver 920_1 at the ONU 904_1 are through dedicated branching ports in the wavelength filters 911 and 912.

Similar to the descriptions above, non-intrusive management channels can be established in the optical layer in the optical network system 900. The non-intrusive management channels can be set up over individual wavelength channels between the corresponding pair of smart optical transceivers 910_1, 910_2 ... 910_N and 920_1, 920_2 ... 920_N. For example, a non-intrusive management channel over wavelength channel Ch1 can be established between the modem 911_1 in optical transceiver 910_1 and the modem 921_1 in optical transceiver 920_1, illustrated by the dashed lines on wavelength channel "Ch1". The network management unit 914 communicates with all smart optical transceivers 910_1 ... 910_N in OLT 901 through communication interfaces similar to the communications between the management module 212 and the modem 211 in the optical communication systems 200 and 300. An example communication interfaces between the network management unit 914 and the smart optical transceivers 910_1 ... 910_N in OLT 901 is an I2C serial communication bus. Through the non-intrusive management channels, the network management unit 914 also has access to the smart optical transceivers 920_1 ... 920_N at the remote ONUs 904_1 ... 904_N. For example, the network management unit 914 can send downstream management data to the smart transceiver 910_1. The modem 911_1 in transceiver 910_1 can send the downstream management data to the modem 921_1 in the smart transceiver 920_1. Similarly, upstream management data can be sent from the modem 921_1 to the network management unit 914 through the modem 911_1. Thus the optical network system 900 including the OLT 901 at the central office and ONUs 904_1 ... 904_N at remote locations can be managed by the network management unit 914 at the OLT 901 while agnostics to user data formats or transmission.

It should be noted that the optical network system 900 only illustrates an example of point-to-multi-point optical network system. The current invention is also compatible with point-to-point optical network systems, in which the wavelength filter 912 and the smart optical transceivers 920_1 ... 920_N can be co-located and integrated into one system similar to OLT 901. An example for such systems is a point-to-point WDM transport system.

It is understood that the specific configurations and parameters described above are meant to illustration the concept of the specification. The disclosed systems and methods can be compatible with variations of configurations and parameters without deviating from the spirit of the present invention. For example, It is understood that the low-amplitude envelop modulation of user data signals is only an exemplified implementation. The disclosed system and methods can utilize other modulation and demodulation techniques, such as and not limited to, frequency modulation and phase modulation. The disclosed optical transceivers, optical communication network, and optical communication systems can include additional components or have different construction as described above. The disclosed optical transceivers can be compatible with other standards not listed in the above description. The disclosed system and methods are compatible with active and passive devices, and point-to-point or point-to-multi-point optical networks.

What is claimed is:

1. An integrated optical transceiver, comprising:
    an optical receiver configured to produce a first electrical signal at a reception electrical interface in response to a first optical signal;
    a power failure monitor configured to detect an imminent power failure in the integrated optical transceiver and to produce a dying-gasp signal when an imminent power failure is detected in the integrated optical transceiver;
    an optical transmitter configured to emit a second optical signal in response to a second electrical signal comprising user data received at a transmission electrical interface, wherein the second optical signal is modulated by the dying-gasp signal;
    a first optical branching device configured to receive the first optical signal at an reception optical interface and to direct at least a portion of the first optical signal to the optical receiver; and
    a second optical branching device configured to direct the second optical signal to an transmission optical interface, wherein the first optical branching device is configured to direct at least a portion of the first optical signal to the second optical branching device, wherein the second optical branching device is configured to direct the portion of the first optical signal received from the first optical branching device to the transmission optical interface.

2. The integrated optical transceiver of claim 1, wherein the first optical branching device and the second optical branching device comprises a beam splitter, an optical switch, or a variable optical attenuator.

3. The integrated optical transceiver of claim 1, wherein the reception electrical interface and the transmission electrical interface comply with a standard selected from the group consisting of SFF, SFP, XFP, and SFP+.

4. The integrated optical transceiver of claim 3, wherein the reception electrical interface and the transmission electrical interface are configured to be plugged into a host network equipment.

5. The integrated optical transceiver of claim 1, further comprises a driver configured to amplify the second electrical signal to produce an amplified electrical signal to drive the optical transmitter, wherein the amplified electric signal is modulated by the dying-gasp signal received from the power failure monitor.

6. The optical communication system of claim 1, wherein the dying-gasp signal is carried by an envelop modulation or on/off toggling in the second optical signal.

7. An optical communication system, comprising:
    a first optical transceiver module, comprising:
        a power failure monitor configured to detect an imminent power failure in the first optical transceiver module and to produce a dying-gasp signal when an imminent power failure is detected in the first optical transceiver module;
        a first transmitter in communication with the power failure monitor, the first transmitter being configured to output a first optical signal comprising the dying-gasp signal at a transmission optical interface in response to an amplified electric signal; and
        a driver configured to amplify a user data signal to produce the amplified electrical signal to drive the first transmitter, wherein the amplified electric signal is modulated by the dying-gasp signal received from the power failure monitor; and
    a second optical transceiver module, comprising:
        a second receiver configured to receive the first optical signal comprising the dying-gasp signal from the first optical transceiver via an optical link and to output a second electrical signal in response to the first optical signal; and
        a dying gasp detector configured to demodulate the first optical signal or the second electrical signal to extract the dying-gasp signal.

8. The optical communication system of claim 7, wherein the first optical transceiver module further comprises a micro controller unit configured to receive the dying-gasp signal from the power failure monitor and send a control signal to the driver to modulate the amplified electric signal.

9. The optical communication system of claim 7, wherein the second optical transceiver module further comprises an amplifier configured to amplify the electrical signal from the receiver and to send a loss-of-signal (LOS) signal to the dying gasp detector.

10. The optical communication system of claim 7, wherein the dying-gasp signal is carried by an envelop modulation or on/off toggling in the first optical signal.

11. The optical communication system of claim 7, wherein the second optical transceiver module further comprises a processing unit configured to demodulate the second electrical signal to extract the dying-gasp signal.

12. The optical communication system of claim 7, wherein the second optical transceiver module further includes a second optical transmitter configured to emit a second optical signal, wherein the first optical transceiver module further comprises:
   a first optical receiver configured to produce a second electrical signal in response to the second optical signal;
   a first optical branching device configured to direct at least a portion of the second optical signal to the first optical receiver; and
   a second optical branching device configured to direct the first optical signal to the transmission optical interface, wherein the first optical branching device is configured to direct at least a portion of the second optical signal to the second optical branching device, wherein the second optical branching device is configured to direct at least a portion of the second optical signal received from the first optical branching device to the transmission optical interface.

13. A method of optical communication by an optical transceiver, comprising:
   producing a first electrical signal at a reception electrical interface by an optical receiver in response to a first optical signal;
   emitting a second optical signal by an optical transmitter in response to a second electrical signal received at a transmission electrical interface wherein the second electrical signal comprises user data;
   producing a dying-gasp signal by a power failure monitor when an imminent power failure is detected in the optical transceiver;
   transmitting the dying-gasp signal in the optical layer of the second optical signal;
   receiving the first optical signal at an reception optical interface by the a first optical branching device;
   directing at least a portion of the first optical signal to the optical receiver by the a first optical branching device;
   directing the second optical signal to an transmission optical interface by a second optical branching device;
   directing at least a portion of the first optical signal to the second optical branching device by the first optical branching device; and
   directing the portion of the first optical signal received from the first optical branching device to the transmission optical interface by the second optical branching device.

14. A method of optical communication, comprising:
   detecting an imminent power failure in a first optical transceiver module by a power failure monitor;
   producing a dying-gasp signal by the power failure monitor when an imminent power failure is detected in the first optical transceiver module;
   outputting a first optical signal comprising user data at a transmission optical interface;
   modulating the first optical signal by the dying-gasp signal;
   receiving the first optical signal modulated by the dying-gasp signal from the first optical transceiver by a second receiver in a second optical transceiver module;
   outputting a second electrical signal in response to the first optical signal; and
   demodulating the first optical signal or the second electrical signal by a dying gasp detector to the dying-gasp signal.

* * * * *